United States Patent
Whitens et al.

(10) Patent No.: US 10,864,875 B2
(45) Date of Patent: Dec. 15, 2020

(54) BIOMIMETIC ARMREST SUBSTRATE FOR A VEHICLE ARMREST ASSEMBLY

(71) Applicant: Ford Global Technologies, LLC, Dearborn, MI (US)

(72) Inventors: Michael James Whitens, Novi, MI (US); Robert D. Bedard, Allen Park, MI (US); Siddharthan Selvasekar, Livermore, CA (US); Amit Chakravarty, Warren, MI (US); Robert Walter Bartus, Romulus, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 100 days.

(21) Appl. No.: 16/265,054

(22) Filed: Feb. 1, 2019

(65) Prior Publication Data

US 2020/0247342 A1 Aug. 6, 2020

(51) Int. Cl.
| | |
|---|---|
| *B60R 21/04* | (2006.01) |
| *B60N 2/42* | (2006.01) |
| *B60N 2/75* | (2018.01) |
| *B60R 13/02* | (2006.01) |
| *G06F 17/50* | (2006.01) |
| *B33Y 10/00* | (2015.01) |
| *B33Y 50/02* | (2015.01) |
| *B33Y 80/00* | (2015.01) |
| *G06F 30/15* | (2020.01) |
| *B60R 21/00* | (2006.01) |

(52) U.S. Cl.
CPC .......... *B60R 21/0428* (2013.01); *B33Y 10/00* (2014.12); *B33Y 50/02* (2014.12); *B33Y 80/00* (2014.12); *B60N 2/4235* (2013.01); *B60N 2/78* (2018.02); *B60R 13/0243* (2013.01); *G06F 30/15* (2020.01); *B60R 2021/003* (2013.01); *B60R 2021/0006* (2013.01)

(58) Field of Classification Search
CPC ............ B60R 21/0428; B60R 13/0243; B60R 2021/003; B60R 2021/0006; B60N 2/4235; B60N 2/78; B33Y 10/00; B33Y 50/02; B33Y 80/00; G06F 30/15
USPC ...................................................... 296/146.7
See application file for complete search history.

(56) References Cited

U.S. PATENT DOCUMENTS

| | | | |
|---|---|---|---|
| 7,681,939 B2 | 3/2010 | Augustyn | |
| 7,828,388 B2 * | 11/2010 | Thomas | B60N 2/4235 297/411.21 |

(Continued)

FOREIGN PATENT DOCUMENTS

| | | |
|---|---|---|
| CN | 203954110 | 11/2014 |
| CN | 104260792 | 1/2015 |

(Continued)

*Primary Examiner* — Joseph D. Pape
*Assistant Examiner* — Dana D Ivey
(74) *Attorney, Agent, or Firm* — David Coppiellie; Price Heneveld LLP (57) ABSTRACT

A vehicle door includes a trim panel coupled to a frame. A single-piece armrest substrate is coupled with the frame. The armrest substrate is a three-dimensionally printed member having interior walls that are printed within the armrest substrate according to a virtual force model generated during a virtual impact scenario. The interior walls define a plurality of voids defined within the armrest substrate.

20 Claims, 9 Drawing Sheets

(56) References Cited

U.S. PATENT DOCUMENTS

| | | | | |
|---|---|---|---|---|
| 8,340,949 B2* | 12/2012 | Kasimsetty | ............ | G06F 30/15 |
| | | | | 703/8 |
| 9,527,458 B2 | 12/2016 | Spell et al. | | |
| 2015/0165943 A1* | 6/2015 | Doan | ................ | B60R 13/0243 |
| | | | | 297/411.21 |
| 2017/0232872 A1* | 8/2017 | Faruque | ................ | B60N 2/78 |
| | | | | 297/411.46 |

FOREIGN PATENT DOCUMENTS

| CN | 105691339 | 6/2016 |
|---|---|---|
| DE | 202016004313 | 8/2016 |

* cited by examiner

BIOMIMETIC ARMREST SUBSTRATE FOR A VEHICLE ARMREST ASSEMBLY

FIELD OF THE INVENTION

The present invention generally relates to vehicle armrests, and more specifically, a vehicle armrest that includes a unitary substrate that is formed of a single member and is formed using a biomimetic formation process for locating interior walls within the substrate.

BACKGROUND OF THE INVENTION

Within conventional vehicles, armrests are typically positioned within vehicle walls and vehicle doors for supporting arms of the driver and passengers within the vehicle. These armrests typically include a substrate that supports the occupant's arm. Additionally, these armrests are designed to absorb lateral loads in the event of a side impact. By absorbing these loads, forces from the side impact can be transferred away from the occupant of the vehicle.

SUMMARY OF THE INVENTION

According to one aspect of the present invention, a vehicle door includes a trim panel coupled to a frame. A single-piece armrest substrate is coupled with the frame. The armrest substrate is a three-dimensionally printed member having interior walls that are printed within the armrest substrate according to a virtual force model generated during a virtual impact scenario. The interior walls define a plurality of voids defined within the armrest substrate.

Embodiments of this aspect of the invention can include any one or combination of the following features:
- a cover member that extends over at least a portion of the armrest substrate to define a supporting surface
- at least one of the voids of the plurality of voids is a body-supporting void that is defined within a top surface of the armrest substrate, wherein the cover member extends over the body-supporting void
- the virtual impact scenario used to generate the virtual force model is an amalgamation of a plurality of impact scenarios
- an enclosed portion of the voids of the plurality of voids are enclosed within the armrest substrate and are inaccessible from an exterior of the armrest substrate
- the virtual force model includes a plurality of force vectors that include use vectors and impact vectors, wherein the use vectors are indicative of a body part placed upon an upper surface of the single-piece armrest substrate, and wherein the impact vectors are indicative of a side impact scenario
- the virtual force model includes connecting bosses that are integrally formed within the single-piece armrest substrate, and wherein the plurality of force vectors are substantially directed toward the connecting bosses According to another aspect of the present invention, a method of forming an armrest substrate includes performing a virtual impact scenario and a virtual use scenario, building a virtual force model using the virtual impact and virtual use scenarios, building a virtual design for a single-piece armrest substrate based upon the virtual force model, three dimensionally printing the virtual design for the single-piece armrest substrate and attaching the single-piece armrest substrate to a vehicle frame.

Embodiments of this aspect of the invention can include any one or combination of the following features:
- wherein the virtual impact scenario includes an amalgamation of data captured from a plurality of virtual impact scenarios
- the virtual force model includes a plurality of force vectors that are directed toward connecting bosses of the virtual design for the single-piece armrest substrate
- the plurality of force vectors of the virtual force model include use vectors that are indicative of a body part placed upon an upper surface of the single-piece armrest substrate
- the plurality of force vectors of the virtual force model include impact vectors that are indicative of a side impact scenario According to another aspect of the present invention, a method of forming an armrest substrate includes performing a virtual impact scenario and a virtual use scenario, building a force vector model using the virtual impact and virtual use scenarios and building a virtual design for a single-piece armrest substrate based upon the force vector model. Interior and exterior walls for the virtual design are located according to a location of vectors of the force vector model. The method also includes three dimensionally printing the interior and exterior walls of the virtual design for the single-piece armrest substrate.

Embodiments of this aspect of the invention can include any one or combination of the following features:
- the vectors of the force vector model include use vectors that are indicative of a body part placed upon an upper surface of the single-piece armrest substrate
- the vectors of the force vector model include lateral vectors that are indicative of a side impact scenario
- the virtual design includes connecting bosses that are integrally formed within the single-piece armrest substrate
- the vectors of the force vector model are directed toward the connecting bosses
- the virtual impact scenario includes an amalgamation of data captured from a plurality of virtual impact tests
- the virtual impact scenario and a virtual use scenario are performed in relation to a predetermined vehicle
- attaching the single-piece armrest substrate to a frame of the predetermined vehicle These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
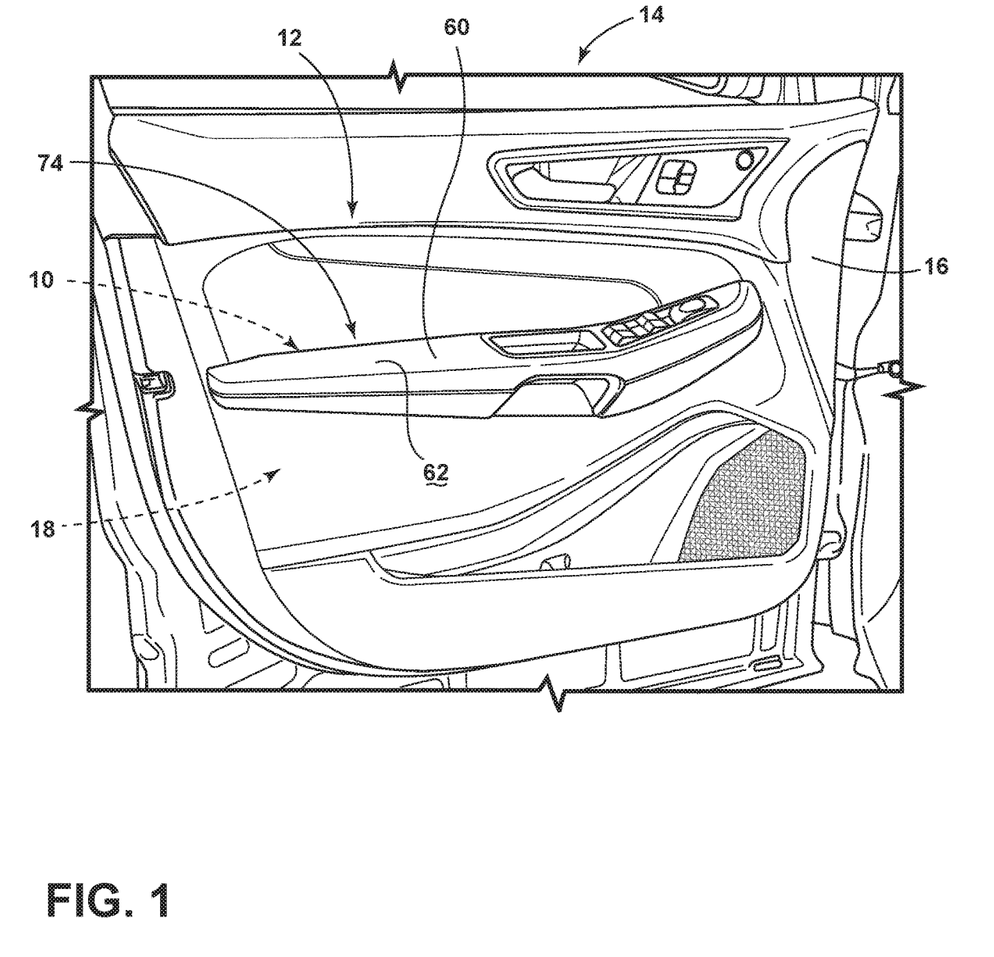
FIG. 1 is a side perspective view of a vehicle door that incorporates an aspect of the biomimetic armrest substrate.
Figure 2:
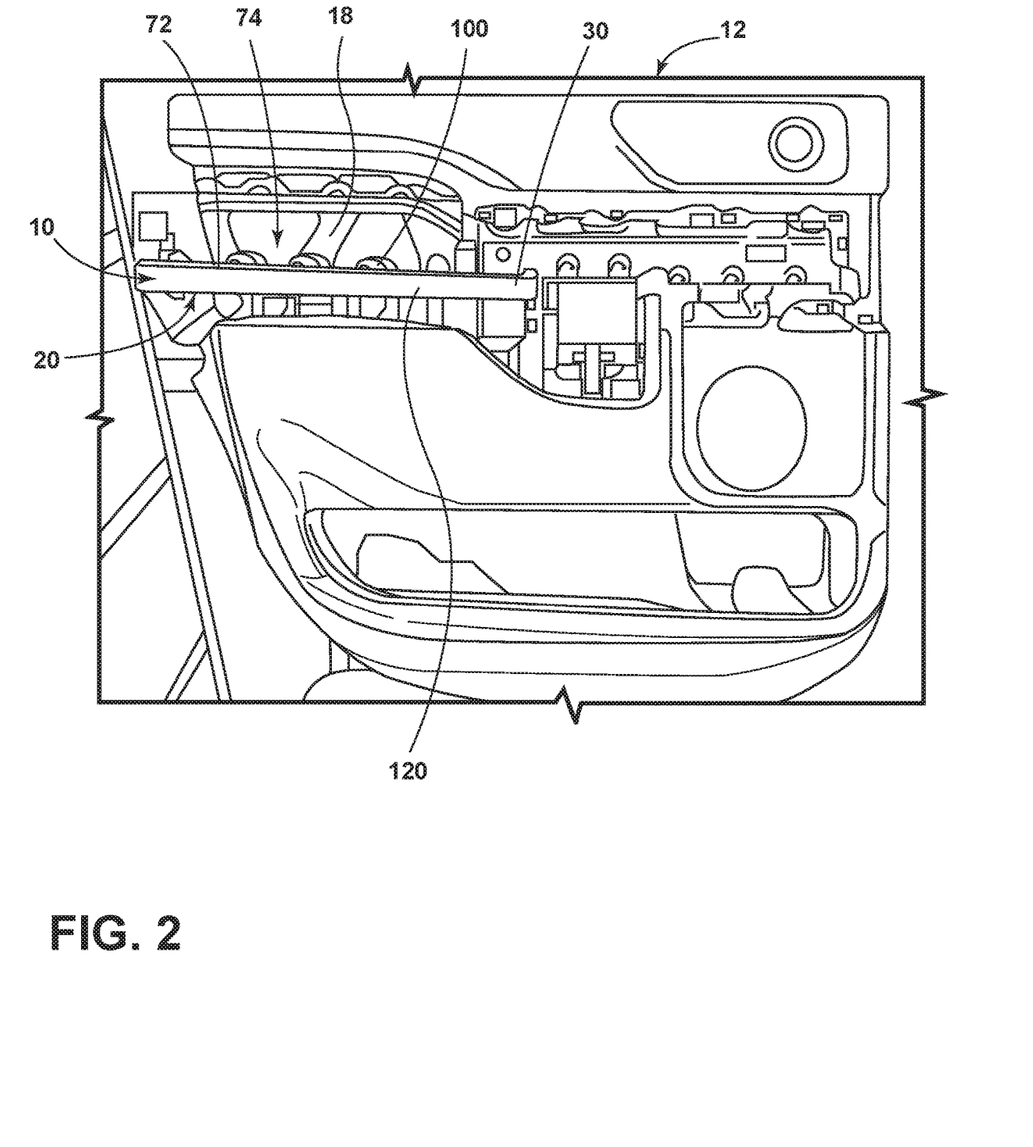
FIG. 2 is a side perspective view of a vehicle door with the interior trim panel removed and an aspect of the biomimetic armrest substrate attached to the frame for the vehicle door.
Figure 3:
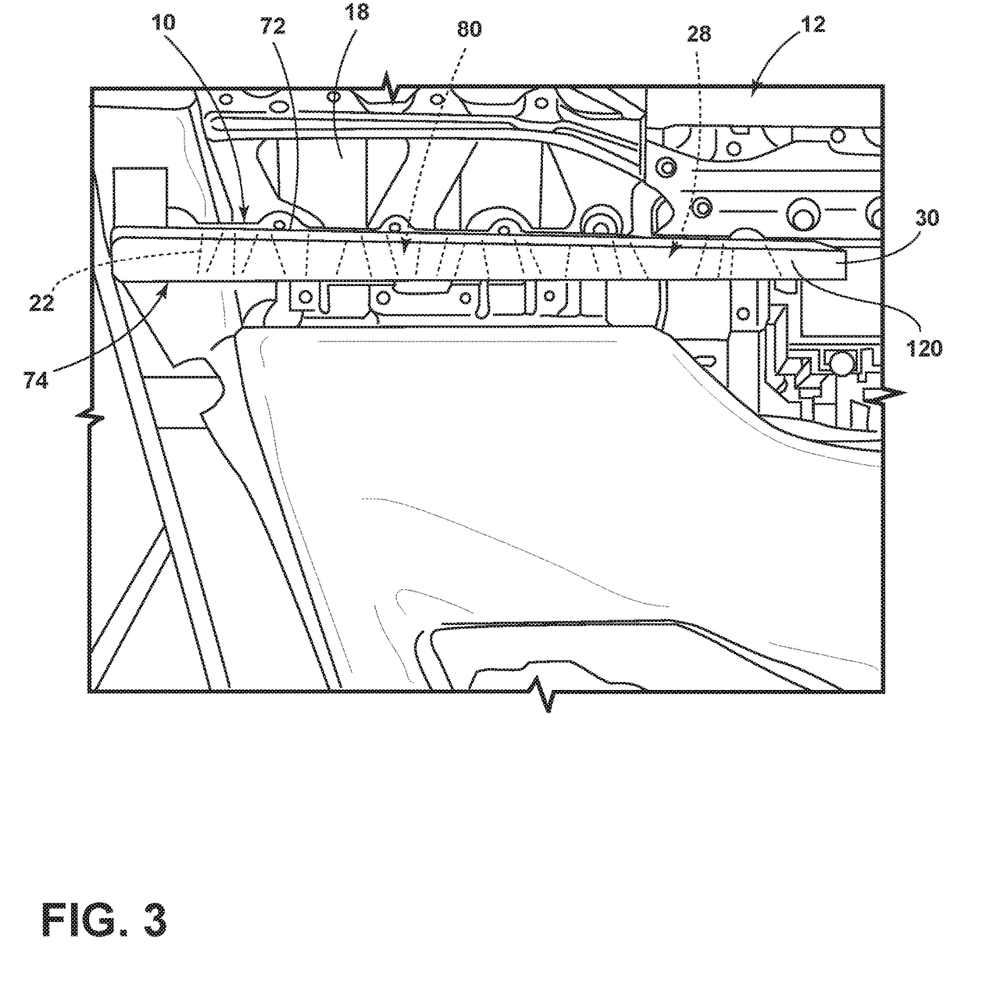
FIG. 3 is an enlarged perspective view of the biomimetic armrest substrate of FIG. 2.
Figure 4:
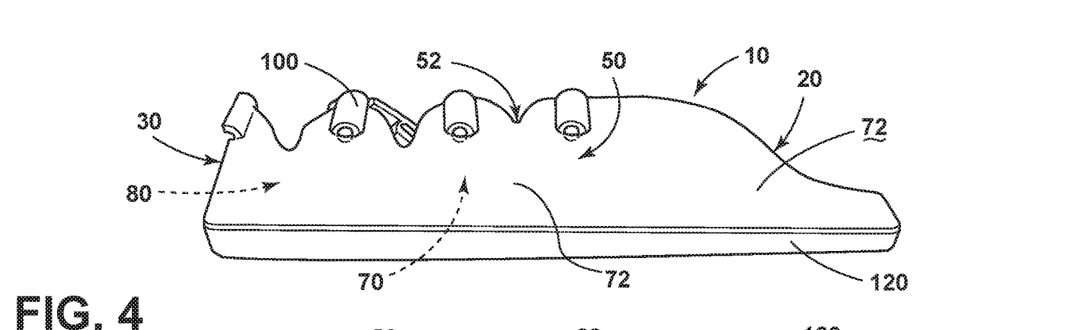
FIG. 4 is a top perspective view of a portion of the biomimetic armrest substrate.
Figure 5:
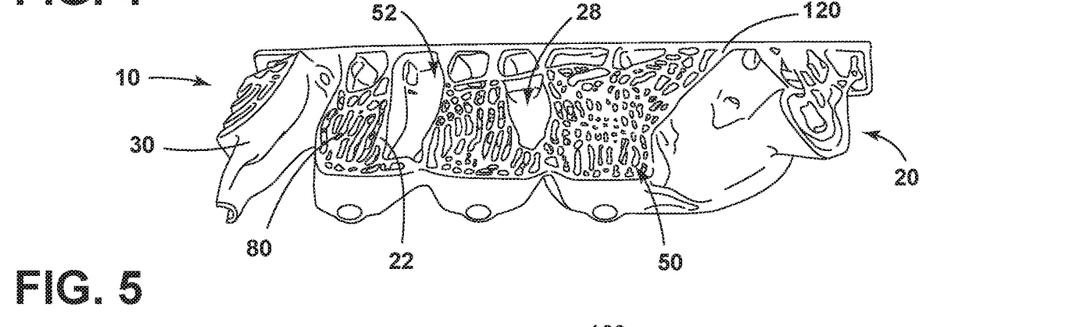
FIG. 5 is a cross-sectional perspective view of the biomimetic armrest substrate of FIG. 4.
Figure 6:
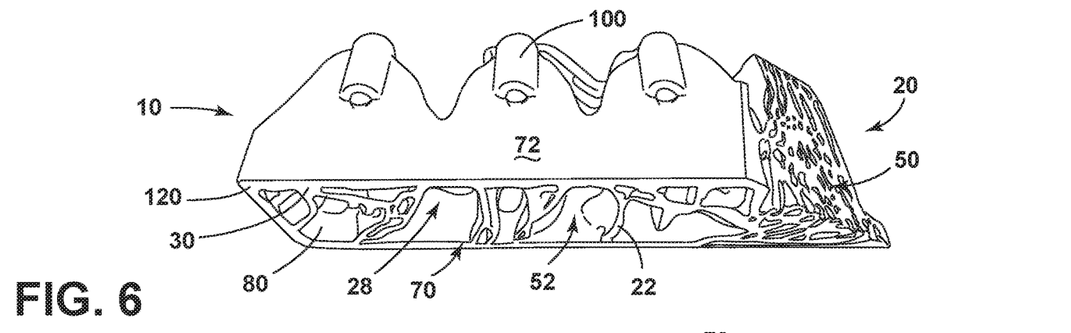
FIG. 6 is a cross-sectional view of the biomimetic armrest substrate of FIG. 4.
Figure 7:
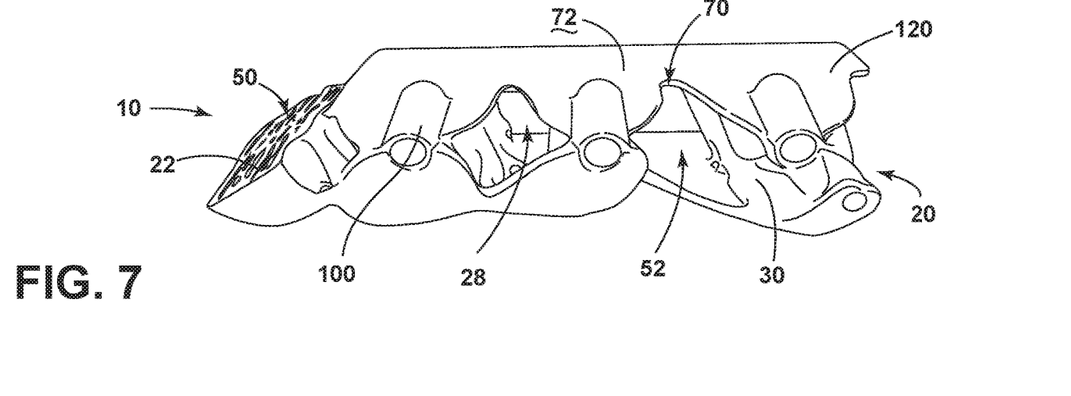
FIG. 7 is a rear perspective view of the biomimetic armrest substrate of FIG. 6.
Figure 8:
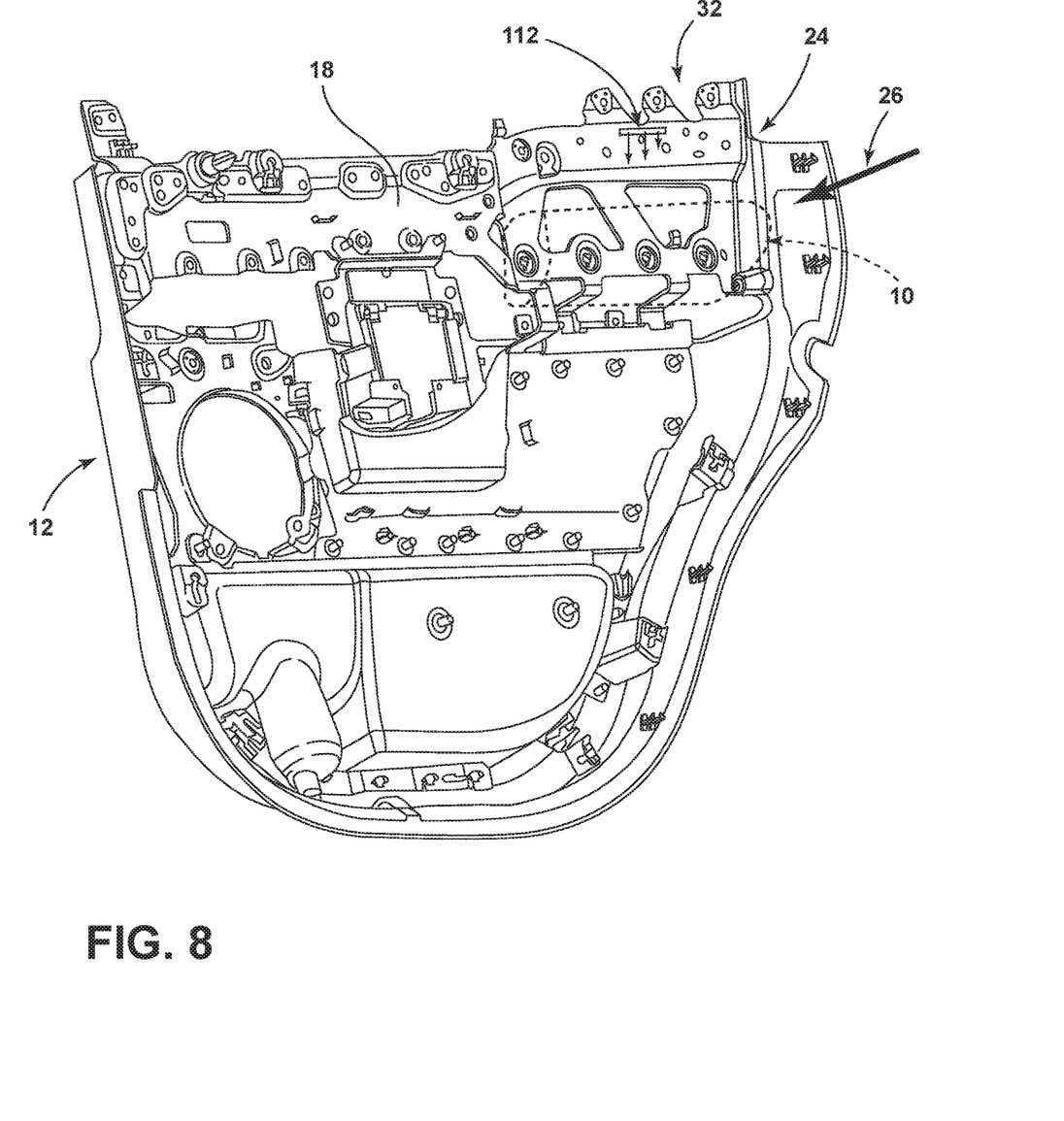
FIG. 8 is an interior perspective view of a frame for a vehicle door and showing the performance of a virtual impact scenario and virtual use scenario on the vehicle frame.
Figure 9:
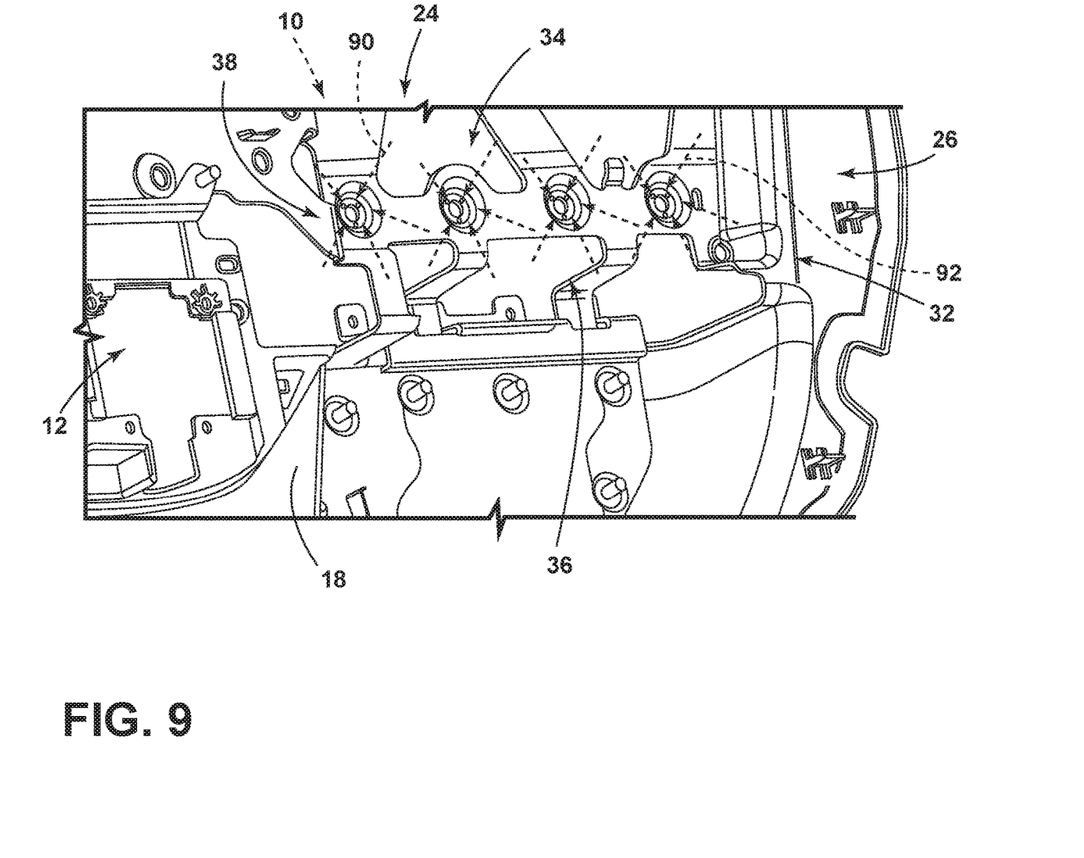
FIG. 9 is a schematic perspective view of a virtual force model formed utilizing data from the virtual impact scenario and virtual use scenario.
Figure 10:
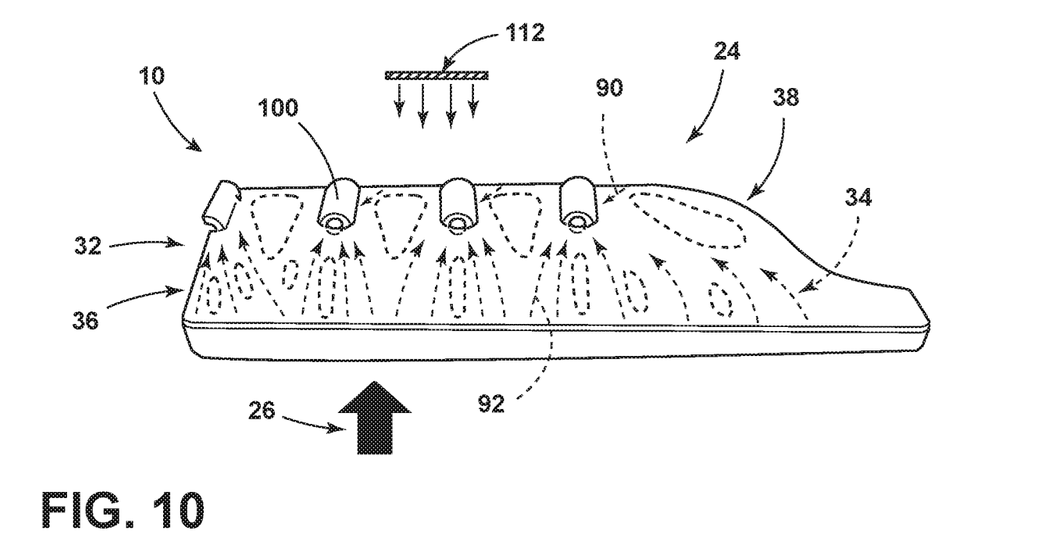
FIG. 10 is a schematic perspective view of a force vector model of an aspect of the biomimetic armrest substrate that is formed using the virtual impact scenario and virtual use scenario.
Figure 11:
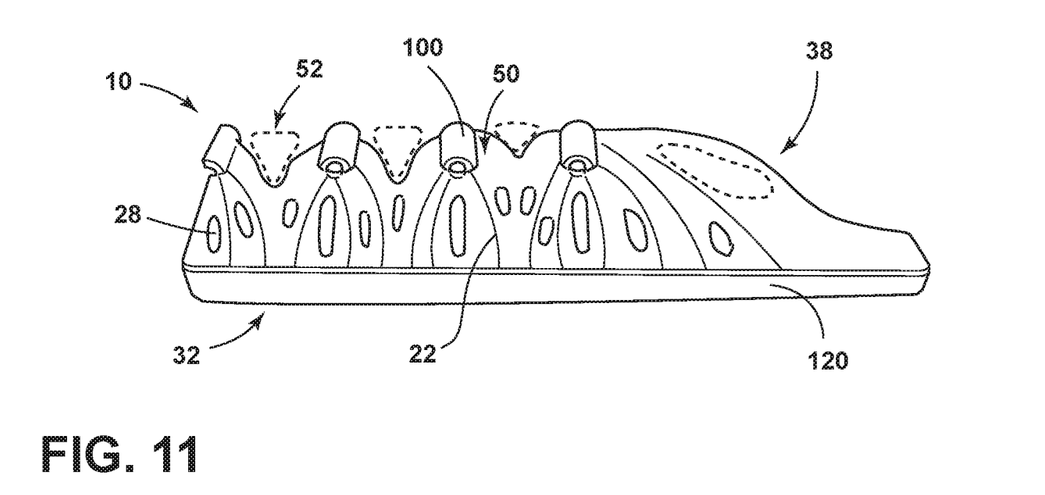
FIG. 11 is a schematic perspective view of a virtual design for the biomimetic armrest substrate constructed using a virtual force model of FIG. 10.
Figure 12:
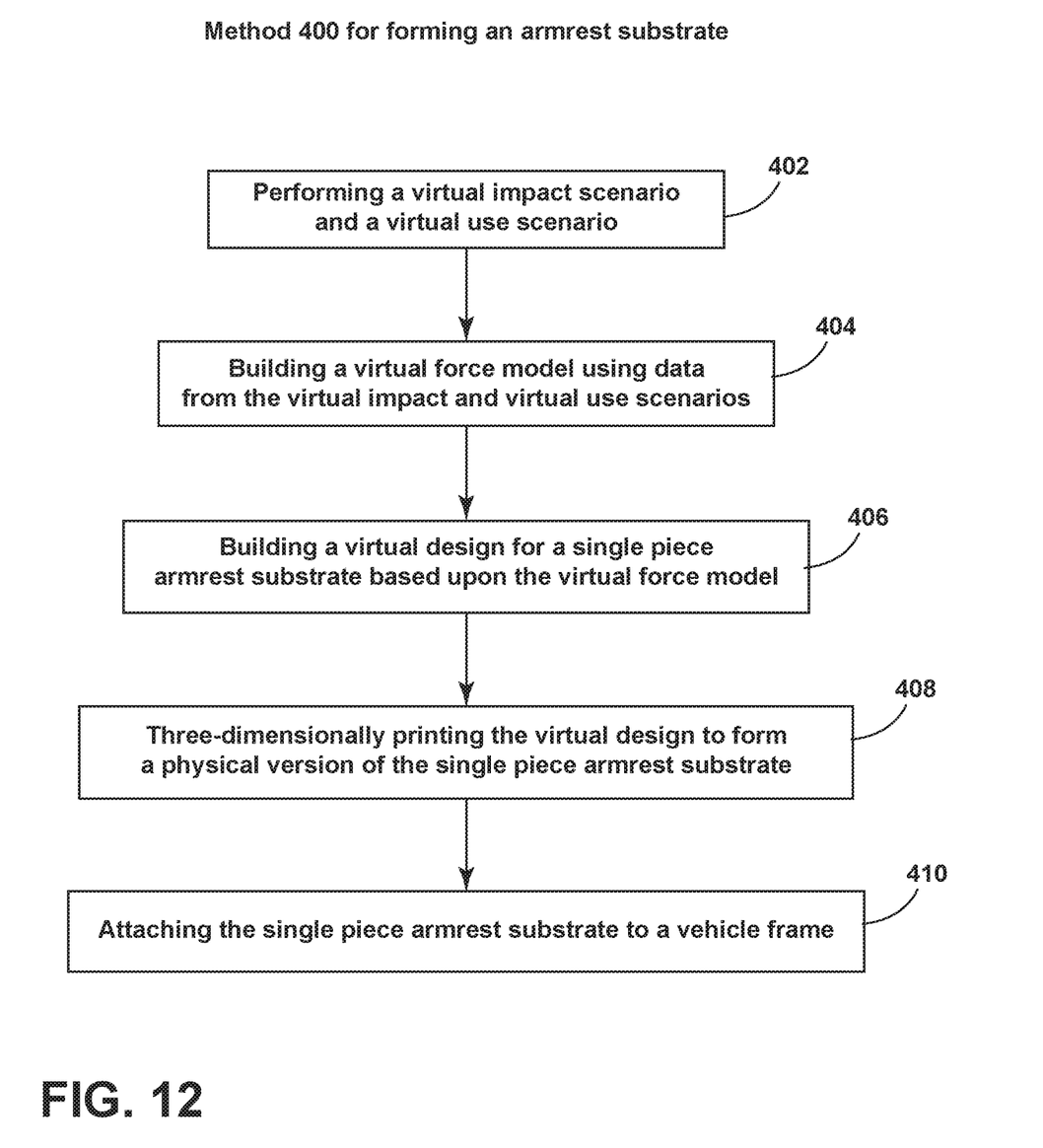
FIG. 12 is a linear flow diagram illustrating a method for forming an armrest substrate.
Figure 13:
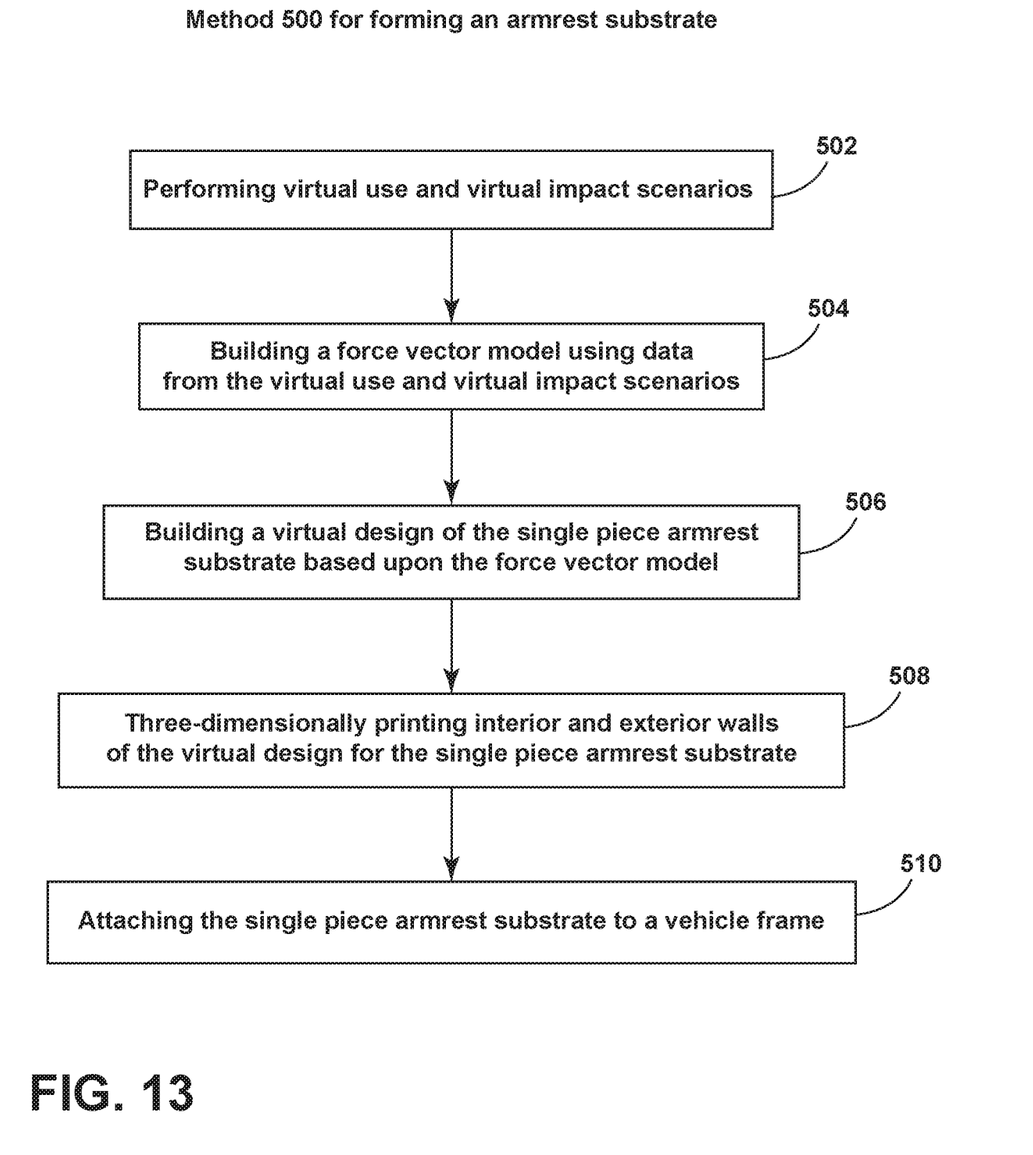
FIG. 13 is a method for forming an armrest substrate utilizing a biomimetic process.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-11, reference numeral 10 generally refers to a biomimetic armrest substrate that is incorporated within a sidewall of a vehicle 14 or a door 12 of a vehicle 14 for supporting a body part of an occupant during use. According to various aspects of the device, the door 12 for the vehicle 14 can include a trim panel 16 that is coupled to a frame 18, such as an inner frame member. A single-piece armrest substrate 10 is coupled with the frame 18. The armrest substrate 10 is a three-dimensionally printed member 20 having interior walls 22 that are printed within the armrest substrate 10, according to a virtual force model 24 that is generated during a virtual impact scenario 26. It is contemplated that the interior walls 22 define a plurality of voids 28 defined within the armrest substrate 10. Using the virtual impact scenario 26, the virtual force model 24 can be utilized to accurately locate printing material 30 for constructing the interior walls 22 for the armrest substrate 10. Typically, the virtual impact scenario 26 used to form the virtual force model 24 can be a virtual lateral side impact of a vehicle 14. This virtual impact scenario 26 is typically performed as a computer model 32 where various forces are used to generate a plurality of force vectors 34 to create a force vector model 36. Using this force vector model 36, a three-dimensional printer can be used to locate printing material 30 that supports the force vectors 34 generated within the force vector model 36.

According to various aspects of the device, the single piece armrest substrate 10 can be physically formed using a three-dimensional printer, where printing material 30 can be located substantially along the path of the various force vectors 34 that make up the force vector model 36. To create the force vector model 36, as discussed above, a computer model 32 of an impact is performed upon a virtual vehicle 14. Within this virtual vehicle 14, a virtual impact scenario 26 is modeled to determine forces that are transferred through the armrest substrate 10. By modeling these various forces that are transferred into and through the armrest substrate 10, structures in the form of interior walls 22 can be added within the armrest substrate 10 that support a designed collapse or crumpling of the armrest substrate 10 to prevent these impact forces from being transferred to the body of an occupant.

During the process of performing the computer model process, various parameters and assumptions are included within the modeling of the side impact scenario. These parameters and assumptions can include an amount of maximum force or load that can be transferred as movement energy into the passenger cabin via the armrest substrate 10. Using these parameters and assumptions, the computer model 32 can generate the force vectors 34 that promote the transfer of these forces into the armrest substrate 10 but not fully into the occupant of the vehicle 14. While the term virtual side impact scenario and side impact scenario are used herein, it should be understood that the virtual impact scenario 26 can include virtual impacts from a range of directions. This virtual impact scenario 26 can also include or can be combined with various use loads, abuse loads and other non-impact loads that may be modeled during the design of the biomimetic armrest substrate 10.

As exemplified in FIGS. 4-7, the force vectors 34 of the force vector model 36 are indicative of the placement of printing material 30 during the three-dimensional printing process. Using the force vector model 36, the biomimetic armrest substrate 10 defines certain reinforced zones 50 and various crumple zones 52 within the structure of the armrest substrate 10. The reinforced zones 50 typically include additional interior walls 22 that are adapted to receive forces from a side impact event. The crumple zones 52 are typically devoid of interior walls 22 or only have limited or minimal numbers of interior walls 22. These crumple zones 52 are typically voids 28 that provide for collapse, bending, and other deflection of the armrest substrate 10 in the event of a side impact event. Using the computer model 32 that incorporates a virtual side impact scenario, these crumple zones 52 and reinforced zones 50 can be properly located to minimize the amount of impact force that is transferred into the occupant of the vehicle 14 during a real-world impact event.

Referring again to FIGS. 1-7, the structure of the door 12 for the vehicle 14 can include a cover member 60 that extends over at least a portion of the armrest substrate 10 to define a supporting surface 62 of the armrest 74. Through this configuration, the armrest 74 includes only two components: the cover member 60 and the single piece armrest substrate 10. Using the single piece armrest substrate 10, the number of components that need to be assembled during manufacture of the door 12 for the vehicle 14 can be greatly diminished. Additionally, using a three-dimensional printing process to form the armrest substrate 10, little waste results from the formation of each single piece armrest substrate 10. Only printing material 30 used to print the structures of the single piece armrest substrate 10 are utilized. Additionally, at least one of the voids 28 of the plurality of voids 28 that are formed within the single piece armrest substrate 10 can be in the form of a body-supporting void 70. This body-supporting void 70 can be defined within or near a top surface 72 of the armrest substrate 10. In such an embodiment, the cover member 60 extends over the body-supporting void 70 such that the cover member 60 provides for a cushioning effect of the armrest 74 for the vehicle 14. It is also contemplated that the body-supporting void 70 can be located below the top surface 72 of the single piece armrest substrate 10. In such an embodiment, the body-supporting void 70 can include only a minimal amount of printing material 30 between the cover member 60 and the body-supporting void 70. This minimal amount of printing material 30 provides for a certain amount of deflection when a user places a body part on the armrest substrate 10 over the body-supporting void 70. This deflection provides a certain amount of comfort for the user when resting upon the armrest 74 for the door 12 of the vehicle 14.

Referring again to FIGS. 8-11, it is contemplated that the virtual impact scenario 26 that is used to generate the virtual force model 24 can be an amalgamation of data captured from the plurality of virtual impact scenarios 26. This amalgamation can include, but is not limited to, impact scenarios of different magnitude, duration of the impact event, different direction, different impact sites on the side of the vehicle 14, and other variations that can be used to provide the amalgamation for generating the virtual force model 24. By using the amalgamation of the plurality of impact scenarios, the interior walls 22 of the single piece armrest substrate 10 can be located and tuned to accurately position the reinforced zone 50 and the crumple zone 52 of the single piece armrest substrate 10.

It is also contemplated that the virtual force model 24 generated by the virtual impact scenario 26 is generated through a single virtual impact scenario 26. In such an embodiment, a single virtual impact scenario 26 is run and data is gathered for generating the virtual force model 24 and the force vector model 36 for locating the interior walls 22 within the armrest substrate 10. By way of example, and not limitation, where a single virtual impact scenario 26 is used, such a virtual impact scenario 26 is typically in the form of a safety test mandated by various governmental agencies for assessing quality and safety of vehicles 14. Using this test, the single piece armrest substrate 10 can be designed to place the reinforced zones 50 and the crumple zones 52, such that impact forces are transferred through the armrest substrate 10 in a manner that achieves the desired impact and safety standards for the various governmental and quality assurance entities governing vehicle manufacturing.

According to various aspects of the device, the plurality of voids 28 can be located to provide various amounts of deflection in the case of impacts. It is contemplated that these voids 28 can include an enclosed portion 80, where the enclosed portion 80 of the voids 28 are enclosed within the armrest substrate 10 and are typically inaccessible from an exterior of the armrest substrate 10. Using conventional manufacturing techniques, such enclosed and internal voids 28 can be difficult to manufacture. Using three-dimensional printing techniques, a single piece armrest substrate 10 that is formed layer by layer using the three-dimensional printing process can be manufactured to include a wide range of geometries including enclosed and internal voids 28 that make up the reinforced zones 50 and crumple zones 52 for the armrest substrate 10.

In forming the virtual force model 24 for the single piece armrest substrate 10, the virtual force model 24 can include a plurality of force vectors 34 that include use vectors 90 and impact vectors 92. The use vectors 90 are typically indicative of forces placed upon the armrest substrate 10 when a body part is placed upon an upper surface of the single piece armrest substrate 10. The use vectors may also include scenarios that are indicative of an abuse load applied to the armrest substrate 10. Accordingly, these use vectors 90 can typically be referred to as common-use force vectors and abuse force vectors that will be experienced during everyday usage of the vehicle 14. The impact vectors 92 of the virtual force model 24 are indicative of a real-world side impact scenario or side impact condition that may be experienced by the vehicle 14 during a collision. The force vectors 34 that make up the virtual force model 24 include each of these use vectors 90 and impact vectors 92 and are combined to locate the positions and configurations of the interior walls 22 and exterior walls 120 of the single piece armrest substrate 10 in the virtual space.

Once located in the virtual space, three-dimensional printing techniques can be used to manufacture the single piece armrest substrate 10 for use within a vehicle 14. Typically, the single piece armrest substrate 10 will be a computer model 32 in virtual space and a particular or predetermined vehicle 14 will be used to virtually model the one or more various virtual impact scenarios 26 for that particular vehicle 14. Variations in connecting mechanisms and methods and variations in occupant packages may also be modeled as part of the virtual impact scenario 26. Using the virtual impact scenario 26 for that predetermined vehicle 14, the virtual force model 24 and the accompanying use vectors 90 and impact vectors 92 can be used to locate the interior walls 22 and exterior walls 120 for the armrest substrate 10 that can be used within that predetermined vehicle 14.

By way of example, and not limitation, virtual impact scenarios 26 can be run on a sedan-type vehicle 14. Forces transferred through the armrest 74 within a sedan-type vehicle may be different than those forces transferred through the single piece armrest substrate 10 for an SUV, van, crossover, coupe, or other type of vehicle 14. Using the virtual impact scenarios 26 for each vehicle type or vehicle model, customizable armrest substrates 10 can be manufactured for each model of vehicle 14 or type of vehicle 14 that is manufactured.

During the virtual modeling and performance of the virtual impact scenarios 26, the three-dimensional virtual model 38 of the armrest substrate 10 can include a plurality of connecting bosses 100 that are integrally formed within the single piece armrest substrate 10. During the modeling of the virtual force model 24 and the force vector model 36 for the single piece armrest substrate 10, the plurality of force vectors 34 are substantially directed through the connecting bosses 100, through which various external forces will be typically directed during a side impact event. Typically, the reinforced zones 50 of the armrest substrate 10 will be positioned in the area of the connecting bosses 100. The various voids 28 within the reinforced zones 50 of the armrest substrate 10 allow for a controlled deflection of these portions of the armrest substrate 10 during an impact event. Conversely, the crumple zones 52 defined by the voids 28 within the armrest substrate 10 can be used to provide tunable or controlled movement that can result in a faster or more accelerated deflection for absorbing certain amounts of external forces during the impact event. The balancing of these reinforced zones 50 and crumple zones 52 is achieved through the use of the virtual model 38 that generates the virtual force model 24 and the force vector model 36 that are used to position the interior walls 22 for the single piece armrest substrate 10.

Referring now to FIGS. 1-12, having described various aspects of the single piece armrest substrate 10 and the virtual modeling used to form the single piece armrest substrate 10, a method 400 is disclosed for forming an armrest substrate 10 using the biomimetic processes described herein. According to the method 400, a virtual impact scenario 26 and a virtual use scenario 112 are performed (step 402).

As exemplified in FIGS. 8-11, side impact forces and use-type forces are virtually exerted upon a frame 18 of a door 12 and the armrest substrate 10. Using data from these virtually performed impact scenarios and use scenarios, impact vectors 92 and use vectors 90 are generated to further define the virtual force model 24 and force vector model 36 that are used to locate the interior walls 22 of the armrest substrate 10. According to the method 400, a virtual force model 24 is built using the virtual impact and virtual use scenarios 112 (step 404). Once the virtual force model 24 is formed, a virtual design for a single piece armrest substrate 10 can be built based upon the virtual force model 24 (step 406). After the virtual design is built, the virtual design for the single piece armrest substrate 10 can be three-dimensionally printed to form the physical version of the single piece armrest substrate 10 (step 408). The single piece armrest substrate 10 is then attached to the vehicle frame during manufacture of the vehicle door 12 (step 410). As discussed above, the virtual design for each single piece armrest substrate 10 can be designed for each particular vehicle model, vehicle trim, or vehicle type. By way of example, and not limitation, a sport-type model of a particular vehicle 14 may provide a different set of data in response to the virtual impact scenario 26 than other types of vehicles 14. Accordingly, the resulting virtual design for the single-piece armrest substrate 10 may vary depending upon the particular trim or style of vehicle 14 being virtually modeled.

Referring now to FIGS. 1-11 and 13, a method 500 is disclosed for forming an armrest substrate 10 using the various biomimetic processes discussed herein. According to the method 500, a virtual impact scenario 26 and a virtual use scenario 112 are performed (step 502). A force vector model 36 is built using the virtual impact and virtual use scenarios 112 and the data harvested therefrom (step 504). A virtual design for a single piece armrest substrate 10 is built based upon the force vector model 36 (step 506). The interior walls 22 and exterior walls 120 for the virtual design are located according to the magnitude and location of the various use vectors 90 and impact vectors 92 of the force vector model 36. According to the method 500, the interior and exterior walls 22, 120 of the virtual design for the single piece armrest substrate 10 are three-dimensionally printed to form a physical version of the single piece armrest substrate 10 (step 508). The single piece armrest substrate 10 can then be attached to a frame of the predetermined vehicle 14 that is virtually tested (step 510).

According to various aspects of the device, the single piece armrest substrate 10 can be used within vehicle walls, such as adjacent to seating positions that may or may not have a dedicated door 12, such as in a coupe or hatchback. The single piece armrest substrate 10 may also be positioned within doors 12 of the vehicle 14 for forming the armrest 74 for that door 12 of the vehicle 14. The biomimetic armrest substrate 10 may also be included in a center console, captain's chair armrests, seat integrated armrests, and other armrest types within the vehicle.

Using the biomimetic processes described herein, armrest substrates 10 can be manufactured for a wide range of vehicles 14 and vehicle seating positions. These vehicles can include, but are not limited to, sedans, coupes, convertibles, vans, mini vans, crossovers, SUVs, mass transit vehicles, cargo vehicles, shipping vehicles, combinations thereof, and other similar vehicles.

The printing material 30 used within the three-dimensional printing processes described herein can include, but are not limited to, plastics, composites, printable metals, various polymers, printable ceramics, foams, combinations thereof, and other similar materials that can be used within the three-dimensional printing mechanisms and processes.

According to various aspects of the device, using the various biomimetic processes described herein, the armrest substrate 10 can be made using less materials and less components, thereby increasing the efficiency in the design, development and manufacture of various components of the vehicle 14. These gained efficiencies can be achieved at least in part due to the diminished need for tooling and assembly labor. Additionally, using the three-dimensional printing processes, the components used within the single piece armrest substrate 10 can be made lighter by maximizing the use of material. This can, in turn, improve fuel efficiency within the vehicle 14. Moreover, precision can be achieved in locating the interior walls 22 and exterior walls 120 for the armrest substrate 10 to increase structural integrity for the armrest 74, while also achieving the necessary deflection for addressing various impact conditions and events experienced by the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door comprising:
a trim panel coupled to a frame; and
a single-piece armrest substrate coupled with the frame, wherein the single-piece armrest substrate is a three-dimensionally printed member having interior walls that are printed within the single-piece armrest substrate according to a virtual force model generated during a virtual impact scenario, and wherein the interior walls define a plurality of voids within the single-piece armrest substrate, wherein the interior walls of the single-piece armrest substrate are positioned in locations corresponding to a plurality of force vectors of the virtual force model, and wherein the plurality of voids are positioned in locations corresponding to regions between the plurality of force vectors of the virtual force model.

2. The vehicle door of claim 1, further comprising:
a cover member that extends over at least a portion of the single-piece armrest substrate to define a supporting surface.

3. The vehicle door of claim 2, wherein at least one void of the plurality of voids is a body-supporting void that is defined within a top surface of the single-piece armrest substrate, wherein the cover member extends over the body-supporting void.

4. The vehicle door of claim 1, wherein the virtual impact scenario used to generate the virtual force model is an amalgamation of a plurality of impact scenarios.

5. The vehicle door of claim 1, wherein an enclosed portion of voids of the plurality of voids are fully enclosed within the interior walls of the single-piece armrest substrate and are inaccessible from an exterior of the single-piece armrest substrate.

6. The vehicle door of claim 1, wherein the virtual force model includes a plurality of force vectors that include use vectors and impact vectors, wherein the use vectors are indicative of a body part placed upon an upper surface of the single-piece armrest substrate, and wherein the impact vectors are indicative of a side impact scenario.

7. The vehicle door of claim 6, wherein the virtual force model includes connecting bosses that are integrally formed within the single-piece armrest substrate, and wherein the plurality of force vectors are substantially directed toward the connecting bosses to define locations of the interior walls of the single-piece armrest substrate.

8. A method of forming an armrest substrate, the method comprising steps of:
    performing a virtual impact scenario and a virtual use scenario;
    building a virtual force model using the virtual impact and virtual use scenarios;
    building a virtual design for a single-piece armrest substrate based upon the virtual force model;
    three-dimensionally printing the virtual design for the single-piece armrest substrate to define a printed single-piece armrest substrate; and
    attaching the printed single-piece armrest substrate to a vehicle frame.

9. The method of claim 8, wherein the virtual impact scenario includes an amalgamation of data captured from a plurality of virtual impact scenarios.

10. The method of claim 8, wherein the virtual force model includes a plurality of force vectors that are directed toward connecting bosses of the virtual design for the single-piece armrest substrate.

11. The method of claim 10, wherein the plurality of force vectors of the virtual force model include use vectors that are indicative of a body part placed upon an upper surface of the single-piece armrest substrate.

12. The method of claim 10, wherein the plurality of force vectors of the virtual force model include impact vectors that are indicative of a side impact scenario.

13. A method of forming an armrest substrate, the method comprising steps of:
    performing a virtual impact scenario and a virtual use scenario;
    building a force vector model using the virtual impact and virtual use scenarios;
    building a virtual design for a single-piece armrest substrate based upon the force vector model, wherein interior and exterior walls for the virtual design are located according to a location of vectors of the force vector model; and
    three-dimensionally printing the interior and exterior walls of the virtual design to define a printed single-piece armrest substrate.

14. The method of claim 13, wherein the vectors of the force vector model include use vectors that are indicative of a body part placed upon an upper surface of the printed single-piece armrest substrate.

15. The method of claim 14, wherein the vectors of the force vector model include impact vectors that are indicative of a side impact scenario.

16. The method of claim 13, wherein the virtual design includes connecting bosses that are integrally formed within the single-piece armrest substrate.

17. The method of claim 16, wherein the vectors of the force vector model are directed toward the connecting bosses.

18. The method of claim 13, wherein the virtual impact scenario includes an amalgamation of data captured from a plurality of virtual impact tests.

19. The method of claim 18, wherein the virtual impact scenario and a virtual use scenario are performed in relation to a predetermined vehicle.

20. The method of claim 19, further comprising the step of:
    attaching the printed single-piece armrest substrate to a frame of the predetermined vehicle.

* * * * *